United States Patent Office 2,740,397
Patented Apr. 3, 1956

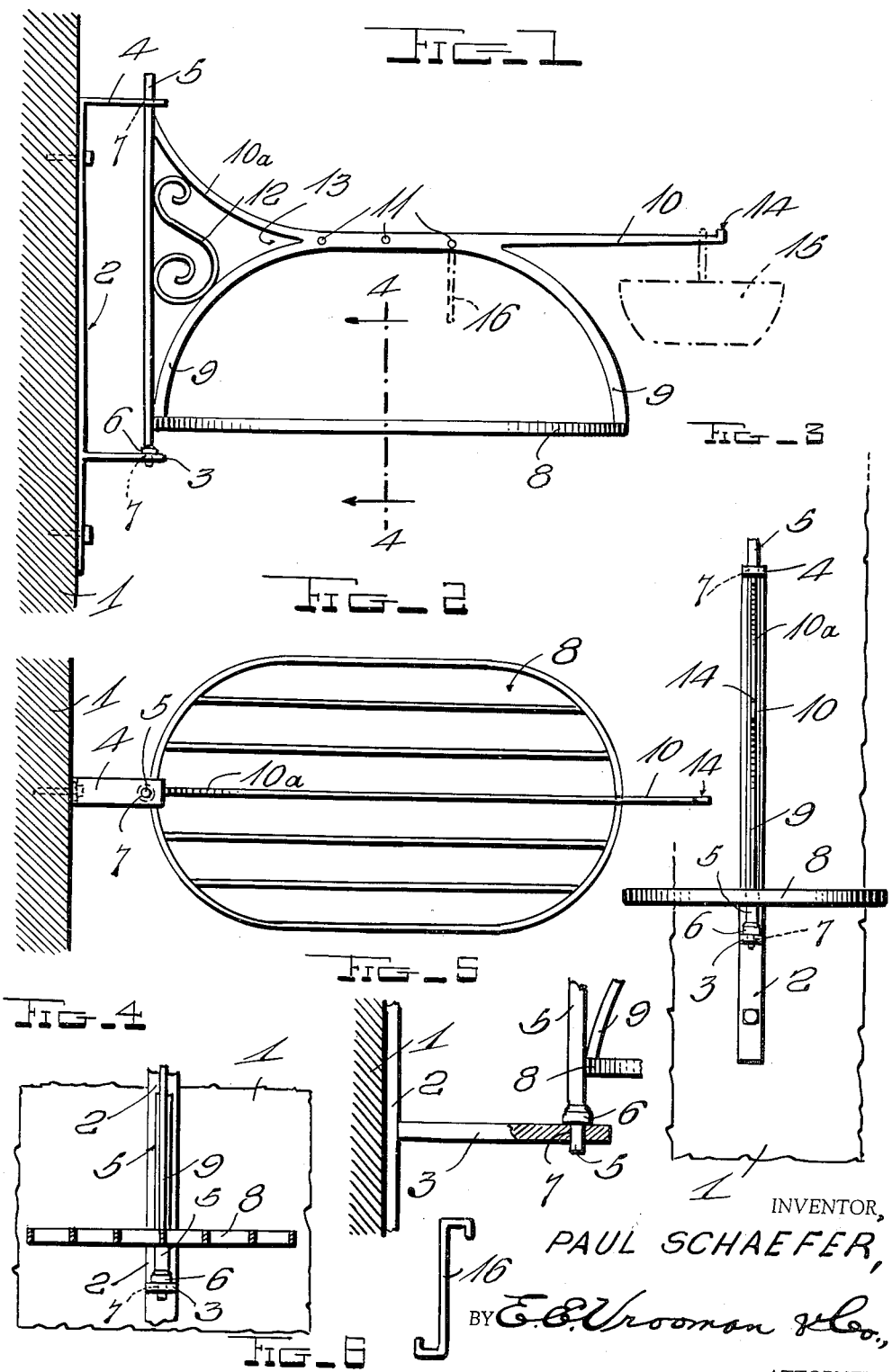

---

2,740,397

FIREPLACE COOKING GRATE AND CRANE

Paul Schaefer, Schenectady, N. Y.

Application September 2, 1954, Serial No. 453,849

1 Claim. (Cl. 126—137)

This invention relates to a fireplace cooking grate and crane.

An object of the invention is to provide a novel device for cooking on fireplaces, both outdoor and indoor.

Another object is to produce a device that is capable of swinging out into the room for the purpose of putting cooking utensils on it, and then swing it in over the fire.

A still further object is to provide a device of this kind which allows the grate unit to be easily removed from its support, when desired.

With the foregoing and other objects in view, this invention comprises certain novel constructions, combinations, and arrangements of parts as will be hereinafter fully described, illustrated in the accompanying drawings, and more particularly pointed out in the appended claim.

In the drawings:

Figure 1 is a view in side elevation of a device constructed in accordance with this invention, while Figure 2 is a top plan view of same.

Figure 3 is an elevated front view of the device.

Figure 4 is a vertical sectional view taken on line 4—4, Figure 1, and looking in the direction of the arrows.

Figure 5 is a fragmentary view showing the device partly in section and partly in elevation.

Figure 6 is a view in side elevation of a hook that may be used in connection with this invention.

Referring to the drawings by numerals, 1 designates a suitable support to which is securely fastened a bracket 2 which has a lower outwardly-extending portion 3 and an upper outwardly-extending portion 4. A vertical rod 5 is mounted on the extended portions 3 and 4. The rod 5 is provided with an enlarged head 6 (Fig. 5) which normally rests against the lower portion 3. The upper end of rod 5 is slidably mounted in the extension 4, whereby upon lifting up on rod 5 the lower end thereof will clear the portion 3 sufficiently to remove the grate 8 from the bracket.

The grate 8 is of an open or slatted structure as is clearly shown in Figure 2. The lower ends of two braces 9 are integral with the ends of grate 8 and these braces are preferably integral with the horizontal crane or handle 10 of the device. In this crane portion of the device are a plurality of horizontal apertures 11 for the purpose hereinafter specified. The inner end of the crane structure 10 is preferably bent upwardly at 10a, merging at its inner end in the rod 5, Fig. 1. An S-shape brace 12 is positioned in the Y-shape portion 13 of the device; this S-shape brace is integral with the contacting portions, producing a very sturdy and efficient structure.

On the outer end of the crane 10 is an upwardly-extending stop 14, which prevents receptacles, such as shown by dotted lines 15, from accidently being displaced or knocked off the crane while the device is in operation.

The apertures 11 are adapted to receive hooks 16, one of which is shown in Figure 6. The hooks 16 are placed in the apertures 11 for suspending food or receptacles containing food over the grate 8; one of these hooks 16 being shown in dotted lines in Fig. 1.

Without departing from the scope of this invention, an iron pipe or rod may be provided in place of the support 1; this support being not shown as it is not an essential element of novelty of the combination. Therefore, it is to be understood that in the following claims, the word "support" is used in a broad sense to designate a wall or a pipe or a rod.

By reason of the extended crane or handle 10 the device can be easily operated to swing it to one side of the support for loading purposes, and when loaded the operator can easily swing the device over the fire for cooking purposes.

The crane or extended handle 10 performs a dual function, to wit, it is a hand grip as well as a pot or kettle support.

While I have described the preferred embodiment of my invention and illustrated the same in the accompanying drawings, certain minor changes or alterations may appear to one skilled in the art to which this invention relates, during the extensive manufacture of the same, and I, therefore, reserve the right to make such alterations or changes as shall fairly fall within the scope of the appended claim.

It is to be understood that I use the word "rod" in a broad sense for designating the element 5, whereas this element might be an iron pipe, or the like.

What I claim is:

In a device of the class described, the combination with a support, of a bracket fastened to said support, said bracket provided with an outwardly-extending lower portion and with an outwardly-extending upper portion, a rod having its ends mounted in said outwardly-extending portions, said rod slidably mounted in the upper portion and mounted to be lifted out of the lower portion, a slatted grate fixedly secured to said rod, upwardly and inwardly-curved braces integral at their lower ends with said grate, a crane structure integral with the upper ends of said braces, said crane structure provided with horizontal apertures over said grate, said crane structure including a horizontal extension with an upwardly-extending stop adapted to be grasped by the operator, the inner end of the crane structure provided with means connecting it to said rod, and a brace connected to and being positioned between said rod and one of said inwardly-curved braces.

References Cited in the file of this patent

UNITED STATES PATENTS

| | | |
|---|---|---|
| 257,202 | Baer | May 2, 1882 |
| 699,066 | Baskett | Apr. 29, 1902 |
| 963,030 | Balch | July 5, 1910 |
| 1,359,349 | Franklin | Nov. 16, 1920 |
| 1,453,997 | Rivet | May 1, 1923 |

OTHER REFERENCES

Book entitled "Successful Fireplaces How to Build Them," at page 80. Published by the Donley Brothers Co., Cleveland, Ohio, 1947. (Copy in 126/120.)